Sept. 9, 1924.
L. C. J. L. CHEVREAU
VEHICLE RUNNER
Filed Nov. 28, 1922
1,508,218
3 Sheets-Sheet 2
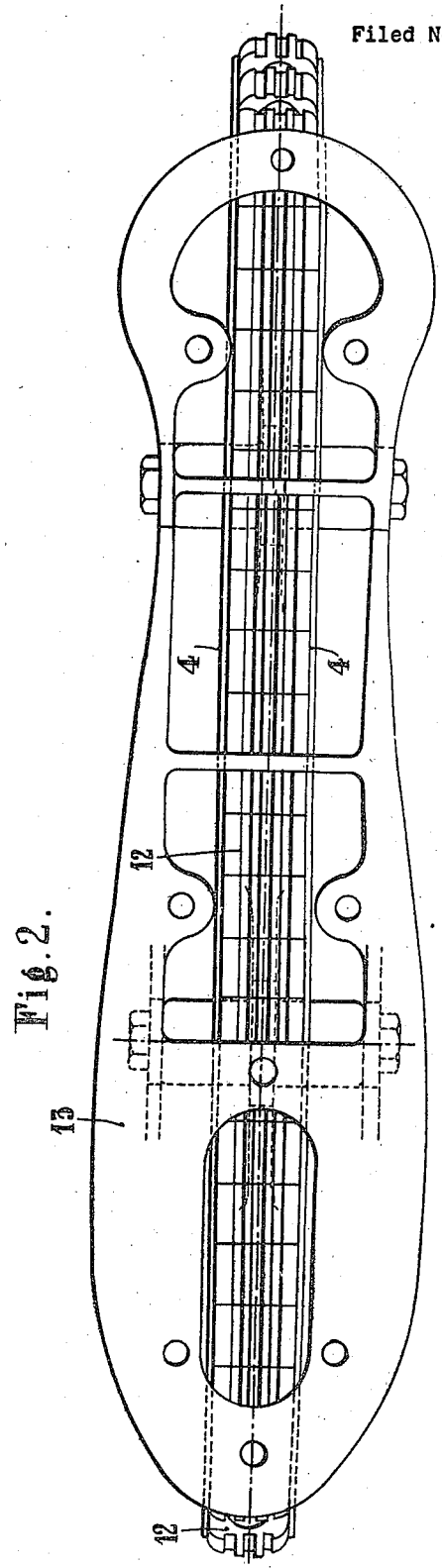
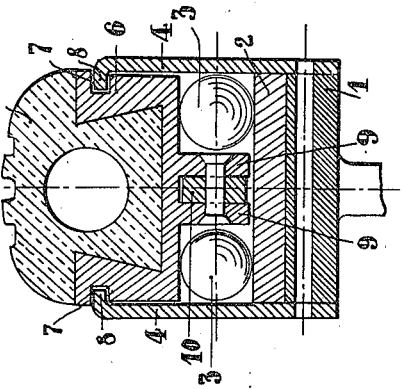
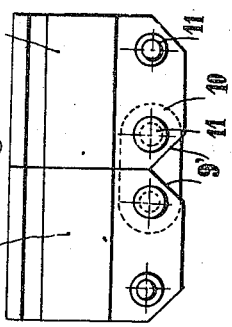
INVENTOR
Lucien C.J.L. Chevreau
BY
ATTORNEY Sept. 9, 1924.
L. C. J. L. CHEVREAU
VEHICLE RUNNER
Filed Nov. 28, 1922
1,508,218
3 Sheets-Sheet 3
Fig. 5.
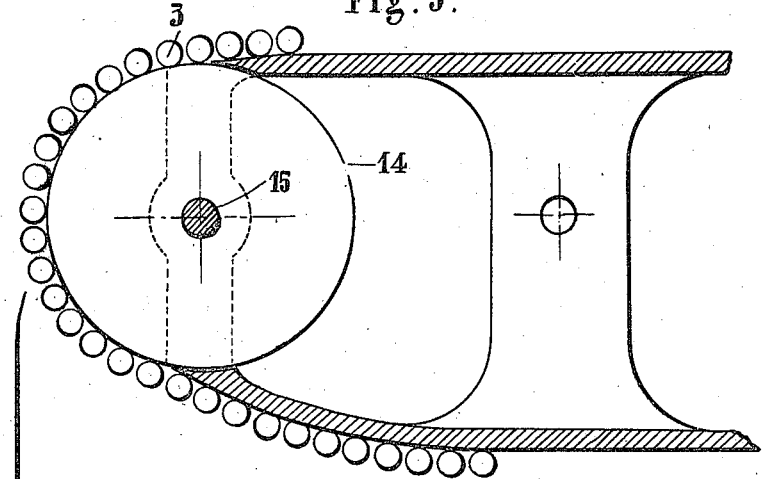
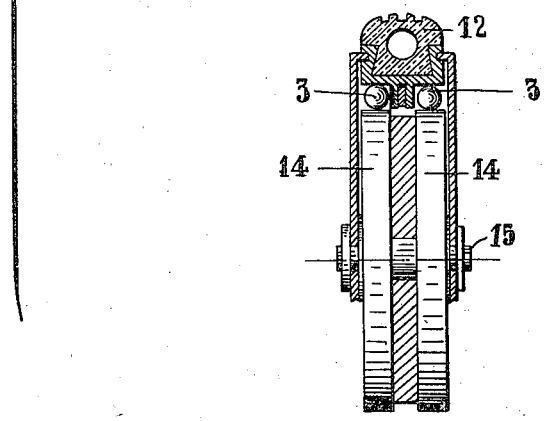
INVENTOR
Lucien C. J. L. Chevreau
BY
ATTORNEY Patented Sept. 9, 1924.

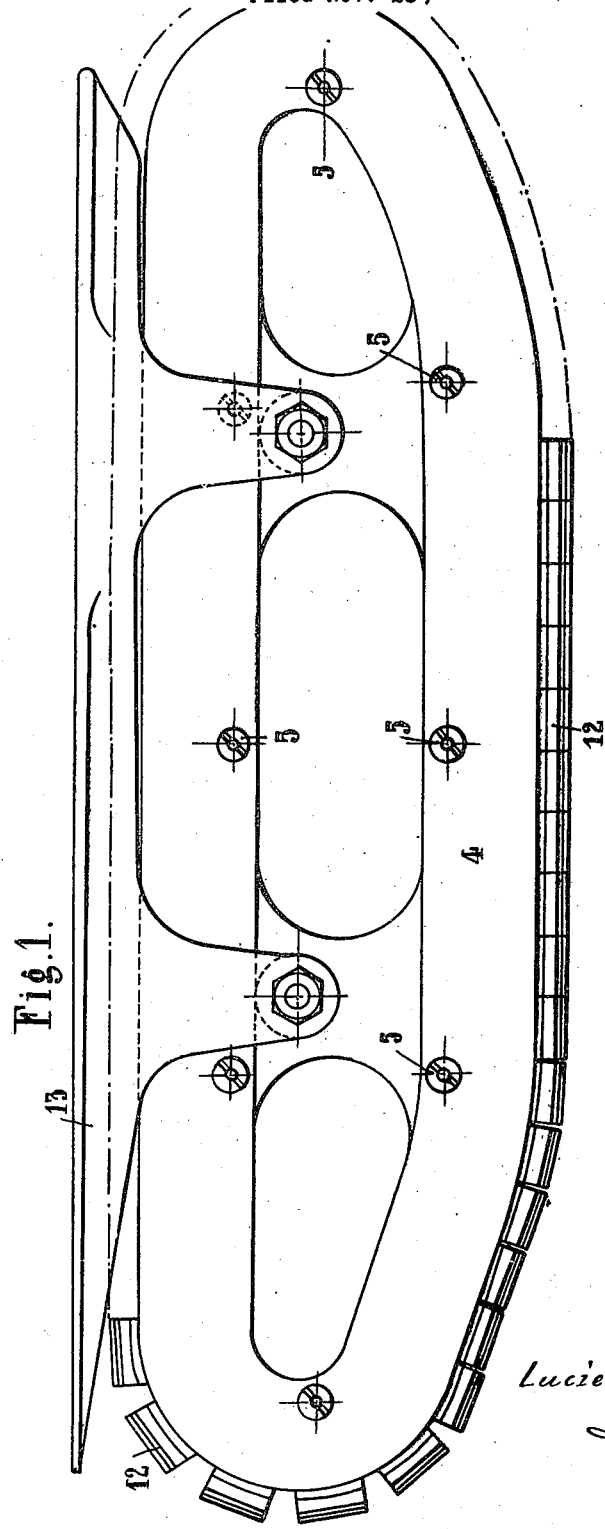

1,508,218

UNITED STATES PATENT OFFICE.

LUCIEN CONSTANT JULES LOUIS CHEVREAU, OF LEVALLOIS-PERRET, FRANCE, ASSIGNOR TO LA SOCIÉTÉ CHEVREAU ET RÉGNIER FRÈRES SIÈGE SOCIAL, OF COURBEROIE, FRANCE.

VEHICLE RUNNER.

Application filed November 28, 1922. Serial No. 603,859.

*To all whom it may concern:*

Be it known that I, LUCIEN CONSTANT JULES LOUIS CHEVREAU, citizen of the Republic of France, and resident of Levallois-Perret, Seine, France, have invented a new and useful Vehicle Runner, which improvements are fully set forth in the following specification.

The object of this invention is to provide a runner essentially characterized by the combination of a double ball bearing with a rigid track and a flexible articulated traction belt.

Said runner, which is adapted to be used as a road runner, can also serve for other purposes, especially in connection with aeroplane landing devices or skids.

In order to make the invention more clearly understood, there is illustrated in the drawings appended hereto, one form of road runner embodying the characteristic features thereof.

In said drawings:

Figure 1 is a side elevation.

Figure 2 is a top plan view of Figure 1.

Figure 3 is a transverse section.

Figure 4 is a detail view on an enlarged scale showing the method of assembling the belt links.

Figure 5 is a view relating to a development.

Referring to the drawings, it will be apparent that the runner built according to the invention is constituted by a suitably shaped metal or other body 1 attached to and supported by a sole 13, on the periphery of which body is arranged a track 2 preferably made of steel, whereon rests a double ball bearing 3 held laterally by side-plates 4 secured to body 1 by screws 5 or any other suitable means.

Said ball bearings support an endless belt or chain composed of steel links 6 provided adjacent their outer ends with two guide grooves 7 in which are adapted to slide the outer rims or edges 8 of side-plates 4 suitably bent for this purpose.

The two rows of balls 3 are separated by two lugs 9, beveled at 9', carried by links 6 and between which are engaged and fixed by rivets 11 the fastening links 10, preferably made of soft steel, serving to connect with one another the tread links 6.

The latter are furthermore provided with a dovetail recess in which is secured a block 12 of rubber (or of some other resilient material) either hollow or solid, the series of such blocks constituting the outer tread of the belt.

The endless chain or belt so made up is arranged, due to its very construction, in such a way that its friction points are reduced merely to its points of contact with balls 3.

In this manner an extremely resilient and smooth tread is obtained which permits ground unevennesses to be run over without any slowing down and without the band being warped at all.

In the development shown by Figure 5, and in order to still further reduce friction, there are arranged on each end of body 1 (such ends being suitably shaped for this purpose) twin rollers 14 connected by a spindle 15 and so positioned that their peripheries form continuations of the track 2 to permit the balls 3 to run thereon.

The other parts are in every way identical with those hereinbefore described.

It is to be quite understood that the invention is not limited to the above described runner, and that the right is reserved to modify the constructional arrangements thereof without departing from its essentially characteristic features.

I may, for instance, make sole 13 of any other form than the one shown and adopt any suitable means to secure the runner in place.

Furthermore, as already stated, constructional modifications regarding the whole device may be introduced in view of its application to landing skids for aeroplanes and the like.

I claim as my invention:

1. A runner, comprising a body having a peripheral track; an endless belt movably encircling said track and consisting of a series of tread links each provided on its inner face with a pair of inwardly-projecting, spaced lugs, and fastening links having their opposite ends pivotally secured in the spaces between the lugs on adjacent tread links to connect the latter together; two series of anti-friction bearings interposed between said track and the inner faces of the tread links and arranged at opposite sides of said lugs; and means attached to the runner body for preventing displacement of said bearings.

2. A runner, comprising a body having a peripheral track; an endless belt movably encircling said track and consisting of a series of tread links each provided on its inner face with an inwardly-projecting member, and pivotal connections between successive links; two sets of anti-friction bearings interposed between said track and the inner faces of the links and arranged at opposite sides of the inwardly-projecting members; rollers mounted at opposite ends of the runner body and having their peripheries so disposed as to form continuations of said track so as to enable said bearings to travel thereon; and means attached to said runner body for preventing displacement of said bearings.

In testimony whereof I have signed this specification.

LUCIEN CONSTANT JULES LOUIS CHEVREAU.